United States Patent [19]

Korte et al.

[11] Patent Number: 5,397,589
[45] Date of Patent: Mar. 14, 1995

[54] PREPARATION OF CALCIUM FORTIFIED POWDERED MILK PRODUCTS WITH IMPROVED DISPERSIBILITY

[75] Inventors: David D. Korte, Battle Creek, Mich.; Paul M. T. Hansen; Karen Fligner, both of Columbus, Ohio

[73] Assignee: Ohio State University Research Foundation, Columbus, Ohio

[21] Appl. No.: 939,185

[22] Filed: Sep. 2, 1992

[51] Int. Cl.$^6$ .................. A23C 9/00; A23C 9/16; A23C 9/20
[52] U.S. Cl. ...................... 426/580; 426/74; 426/585; 426/587; 426/588
[58] Field of Search .............. 426/588, 74, 522, 580, 426/587, 585

[56] References Cited

U.S. PATENT DOCUMENTS

| | | | |
|---|---|---|---|
| 2,541,568 | 2/1951 | Baur et al. | 99/54 |
| 2,661,294 | 7/1949 | Meade | 426/471 |
| 2,994,612 | 8/1961 | Rice et al. | 99/56 |
| 3,185,580 | 5/1965 | Hanrahan et al. | 99/203 |
| 4,871,573 | 10/1989 | Bohren et al. | 426/588 |

FOREIGN PATENT DOCUMENTS

| | | | |
|---|---|---|---|
| 0195167 | 9/1986 | European Pat. Off. | A23C 11/10 |
| 0235514 | 9/1987 | European Pat. Off. | C07C 59/105 |
| 347739 | 3/1905 | France | 23/152 |
| 1043467 | 1/1959 | Germany | 53/23 |
| 1149231 | 5/1963 | Germany | 53/23 |
| 2120519 | 12/1983 | United Kingdom | |
| 2161361 | 7/1985 | United Kingdom | |
| 9202235 | 2/1992 | WIPO | |

OTHER PUBLICATIONS

"Stabilization of soy milk fortified with calcium gluconate", *Food Hydrocolloids*, vol. 4 No. 5, pp. 415–422, 1991.

"Methods for Increasing Calcium in Cottage Cheese", *Cultured Dairy Products Journal*, Aug. 1991, pp. 11–14, 16 and 18.

Derwent Abstract, "Milk Replacer Composition For Calf", Japanese Publication No. JP57186-445 (Nov. 16, 1982).

Derwent Abstract, KR 8904-270-B.

*Primary Examiner*—Donald E. Czaja
*Assistant Examiner*—Curtis E. Sherrer
*Attorney, Agent, or Firm*—Ralph J. Mancini; Louis A. Morris

[57] ABSTRACT

The present invention relates to calcium fortified powdered milk products with improved dispersibility in aqueous media and a process for the production thereof. The process generally comprises blending a milk product with a calcium fortification system to form a calcium fortified mixture; cooling said calcium-fortified mixture down to a temperature effective to initiate lactose crystallization; and, dehydrating said calcium-fortified mixture to obtain a calcium fortified dry milk powder with improved dispersibility in aqueous media.

11 Claims, 5 Drawing Sheets

PREPARATION OF CALCIUM FORTIFIED POWDERED MILK PRODUCTS WITH IMPROVED DISPERSIBILITY

FIELD OF THE INVENTION

The invention generally relates to the production of a calcium fortified dry milk powder with improved dispersibility in aqueous media.

BACKGROUND OF THE INVENTION

Calcium is a major mineral and essential in human nutrition. It is the most abundant cation in the body where approximately 99% of the calcium occurs in the bones and teeth providing an exchangeable pool of calcium, strength and structure. The remaining one percent is widely distributed in cells and body fluids and is responsible for the regulation of a number of metabolic functions such as nerve impulse conduction, muscle fiber contraction, hormone secretion, blood coagulation, normal heart beat, activation of enzymes and maintenance of cell membranes.

Recently, calcium has received increased attention in dietary regimens because of its possible role in the prevention of diseases such as osteoporosis, hypertension and colon cancer. The recommended daily allowance (RDA) for calcium is currently 900 mg for adult males and females. Dairy products represent an excellent source of calcium, and in Western countries, the RDA for calcium is primarily met through the consumption of dairy products. It is generally believed that certain disease states, such as osteoporosis, are a result of habitual low intakes of calcium throughout the life span, related to low intakes of dairy products. Currently, it is recommended that individuals at risk for calcium-related disease, particularly women in relation to osteoporosis, increase their calcium intake to 1200-1500 mg calcium per day. Accordingly, a need exists for dairy products which will provide larger amounts of calcium in a single serving. Such products would meet the needs of individuals at risk for calcium-related disease and provide individuals who choose not to consume large amounts of dairy products an alternative to tablet supplements to meet their calcium requirements.

Many calcium fortified products formulated to meet the needs of individuals at high risk for calcium-related diseases are known in the prior art.

U.S. Pat. No. 2,541,568 discloses a non-curding high calcium milk product and method for producing same. More specifically, a calcium bearing compound, such as calcium gluconate is added to cows' milk to increase the calcium to phosphate ratio thereof, which allegedly destroys the curd forming tendencies of said milk. A spray dried milk powder comprising calcium gluconate is also disclosed.

GB 2120519 relates to a process for the preparation of calcium-magnesium food supplements. The process generally comprises spray drying a solution of calcium gluconate, magnesium carbonate and cider vinegar to obtain a dry free-flowing powder which is alleged to be completely soluble in warm water.

KR 8904270 describes a method for preparing an instant milk coffee preparation. More specifically, a liquid mixture of instant coffee, sugar, milk protein, lactose, sucrose, calcium, vitamins and vegetable oil is condensed to a Solids content of 30-55%, and thereafter spray dried. The resultant milk coffee preparation allegedly dissolves well in water regardless of its temperature.

The article in *Food Hydrocolloids*, Vol. 4, No. 5, pp 415-422 (1991), discloses a high-calcium soy milk wherein calcium gluconate is employed as a calcium source. The preparation also contains a calcium sequestering agent (sodium hexametaphosphate) and a calcium gluconate stabilizing agent (calcium-D-saccharic acid). The resultant soy milk allegedly possesses a calcium content comparable to bovine milk and satisfactory heat stability.

WO 92/02235 discloses nutritional mineral supplements comprising calcium citrate malate, and salts of magnesium, copper and zinc.

The prior art also discloses various dry milk products including nonfat dry milk. Nonfat dry milk is defined as the product obtained by the removal of water only from pasteurized skim milk. It typically contains not more than 5 wt % moisture, and not more than 1.5% milkfat, unless otherwise indicated. However, many of these products suffer from poor dispersibility, and are therefore difficult to reconstitute. Additionally, it is desirable to increase the calcium content of nonfat dry milk powder while at least maintaining, or preferably increasing the dispersibility thereof.

Accordingly, it is an object of the present invention to provide a process for preparing a calcium fortified dry milk powder with improved dispersibility.

A further object of the present invention is to provide a calcium fortified dry milk powder with improved dispersibility.

SUMMARY OF THE INVENTION

The present invention generally relates to a process for the production of calcium-fortified dry milk powder having improved water dispersibility. More particularly, the present process contemplates a milk product fortified with a calcium fortification system which when spray dried, contributes to the formation of a dry milk powder containing a significant amount of crystalline rather than amorphous lactose. The dry milk powder of the present invention is easier to disperse in water resulting in an improved rate of reconstitution of the dry milk powder.

DETAILED DESCRIPTION OF THE INVENTION

Figure 1A:
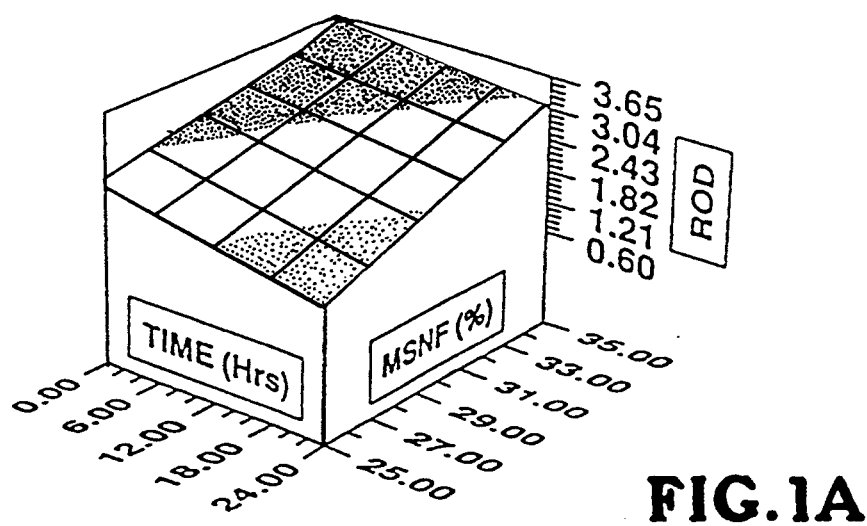
FIG. 1 is a three dimensional graphical representation of the Rate of dispersion (ROD) v. holding time v. MSNF % (milk solids non-fat %) at the 100% calcium fortification level (FIG. 1A), the 50% calcium fortification level (FIG. 1B), and the 0% fortification level (FIG. 1C).

The present invention relates to a process for the preparation of a calcium fortified dry milk powder with improved dispersibility in aqueous media, such as water. The present process generally comprises blending a milk product with a calcium fortification system to form a calcium fortified mixture; optionally pasteurizing said calcium fortified mixture; cooling said calcium fortified mixture down to a temperature effective to initiate lactose crystallization; and dehydrating said calcium fortified mixture to obtain a calcium-fortified dry milk powder with improved dispersibility.

As employed herein, "milk product" shall mean skimmed milk, lowfat milk, whole milk, non-fat milk, filled milk, condensed milk, evaporated milk, concentrated milk including concentrated lowfat milk and concentrated non-fat milk, mixtures thereof and the like. Alternatively, the milk product may be reconstituted from dry milk including lowfat dry milk, non-fat dry milk, and the high and low heat varieties of same, mixtures thereof and the like. Preferred milk products include, but are not limited to concentrated milk, and milk reconstituted from non-fat dry milk powder.

The term "calcium fortification system" comprises a calcium source which is preferably taste neutral and soluble. Examples of calcium salts employable in the present invention include but are not limited to food grade calcium salts of organic acids, such as calcium lactate, calcium gluconate, calcium lactogluconate, calcium lactobionate, levulinate, glubionate, gluceptate, ascorbate and the like. A preferred calcium fortification system comprises calcium lactogluconate. Another preferred embodiment contemplates a calcium fortification system which comprises calcium gluconate and calcium saccharate.

The calcium fortified mixture is optionally pasteurized prior to the initiation of lactose crystallization. While pasteurization of dairy products is a legal requirement, the present dry milk powder need not be pasteurized if, for example, it is merely an ingredient in an end product which will be subjected to pasteurization. Pasteurization, if desired, should be conducted in accordance with the requirements of 21 C.F.R §131.125.

Prior to the cooling step for initiation of lactose crystallization, it is preferred that the calcium fortified mixture contain from about 30% to about 55% milk-solids-non-fat (MSNF). This level may be achieved by, for example, initially employing as a starting material, a milk product having high MSNF %. Alternatively, the MSNF % of the calcium fortified mixture can be increased to acceptable levels by concentrating the calcium fortified mixture prior to initiation of lactose crystallization.

The cooling step "effective to initiate lactose crystallization" is defined as the time and temperature conditions to which the calcium fortified mixture must be subjected to initiate the formation of crystalline lactose. Lactose crystallization can usually be initiated when the calcium fortified mixture is cooled to a temperature range of from about 0°–20° C. A preferred temperature range is from about 1°–5° C. A more preferred temperature range is from about 2°–3° C. If needed, the mixture may be seeded with a small amount of α-lactose monohydrate to hasten crystallization.

Dehydration of the calcium fortified mixture can be accomplished by a variety of conventional techniques, such as spray drying, roller drying and freeze drying. Spray drying is a preferred means for dehydration.

Spray drying of the cold calcium fortified mixture can be conducted under conventional conditions. It is preferred, however, that spray drying be conducted promptly after lactose crystallization is observed, without preheating the calcium fortified mixture. Preheating prior to spray drying, or any other form of dehydration, can lead to the solubilization of the formed lactose crystals. Alternatively, holding the calcium fortified mixture for too long a time period prior to spray drying can lead to the formation of unacceptably large lactose crystals which may present problems during the spray drying procedure. Satisfactory results can generally be obtained if the calcium fortified mixture containing lactose crystals is fed to the spray dryer at a temperature not exceeding about 20° C.

The pH of the milk suspension may optionally be adjusted by, for example, the addition of alkaline salts which will generally lower the pH of the mixture. Alkaline agents which are employable to adjust pH include, but are not limited to soluble salts of citrates, or polyphosphates. A preferred pH is in the range of naturally occurring cows milk, which is usually in the range of from about 6.7 to about 7.1.

In another embodiment, the present invention contemplates a process of preparing a calcium fortified dry milk powder which comprises blending concentrated milk with a calcium fortification system which comprises calcium gluconate and calcium saccharate to form a calcium fortified mixture; optionally pasteurizing said calcium fortified mixture; cooling said calcium fortified mixture to a temperature of from about 1° C. to about 3° C. and holding same at said temperature range until lactose crystal growth is observed; and spray drying said calcium fortified mixture to obtain a calcium fortified dry milk powder with improved dispersibility.

In still another embodiment, the present invention contemplates a process of preparing a calcium fortified dry milk powder which comprises directly blending concentrated milk with a calcium fortification system comprising a concentrated solution of calcium lactogluconate and/or calcium lactogluconate powder to obtain a calcium fortified mixture; optionally pasteurizing said calcium fortified mixture; rapidly cooling said calcium fortified mixture to a temperature of from about 1° C. to about 3° C. and holding same at said temperature range until initiation of lactose crystallization; and spray drying said calcium fortified mixture to obtain a calcium fortified dry milk powder with improved dispersibility.

In yet another embodiment, the present invention contemplates a process of preparing a calcium fortified dry milk powder which comprises blending a calcium fortification system into an already pasteurized concentrated milk system to obtain a calcium fortified mixture; optionally adjusting the pH of said calcium fortified mixture; rapidly cooling said calcium fortified mixture to a temperature of from about 1° C. to about 3° C. and holding same at said temperature range until initiation of lactose crystallization; and spray drying said calcium fortified mixture to obtain a calcium fortified dry milk powder with improved dispersibility.

The present invention also contemplates a dry milk powder with improved dispersibility which contains a significant amount of crystalline lactose.

The basic structure of a spray dried dry milk particle is that of a roughly spherical matrix of milk proteins, milk fat and minerals, as well as lactose that surrounds a central vacuole. The dispersity characteristics of milk powder depends on the total surface area of the powder and on the surface properties of the particles. The physical surface structure of individual powders depends on the nature of the material being spray dried. This is particularly true of lactose which may dry either in an amorphous, hygroscopic state, or a crystalline, hydrated state.

Lactose is commonly referred to as milk sugar with the mammary gland being the sole source. It is a disaccharide composed of D-glucose and D-galactose. Lactose makes up five to six percent of bovine milk, and approximately 52 percent of the content of regular spray dried nonfat milk powders. It is generally accepted that in known spray dried milk powders, lactose occurs in the amorphous state.

Dispersibility, which is an empirical term describing the ease of reconstitutibility of milk powder, is closely associated with wettability and solubility. Wettability, which is the first step of reconstitution, means the ease with which a powder will become wetted with water. Once a powder has become wetted, it must move into the liquid medium and remain suspended, a property which is known as dispersibility. When the powder loses its identity as a powder particle and resumes its original state as milk, it is solubilized.

The wetting of milk powder by water is generally influenced by the state of lactose which is present in the continuous phase of the wall of the milk particle. In milk powder of the prior art, lactose appears primarily in the amorphous state. Amorphous lactose present in the wall of prior art milk powders, is very hygroscopic and easily absorb moisture. When the moisture content of the powder approaches 7 percent or higher the amorphous state of lactose will change and crystallization of lactose will occur. When lactose in milk powder crystallizes in this manner, as a consequence of moisture absorption, problems with caking and lumping occur. The simultaneous occurrence of non-enzymatic browning when lactose crystallizes in this manner is also known to occur.

The present invention obviates the above inherent problems of caking, lumping and browning associated with prior art milk powders containing primarily amorphous lactose in the milk particle wall. More particularly, the present process produces a milk powder which contains primarily crystalline rather than amorphous lactose. Thus, the problems associated with changes of lactose from amorphous to crystalline states upon reconstitution of prior art milk powders is mitigated substantially by the present invention.

The invention is illustrated by the following non-limiting examples.

EXAMPLE 1

Milk Product

Regular nonfat dry milk, USPHS Grade A, manufactured by Agrimark, Inc. was reconstituted and used as the milk product in accordance with the process of the present invention.

Calcium Fortification System

The calcium fortification system comprises a liquid solution of calcium gluconate/calcium saccharate. More particularly, a liquid solution (20% total solids) of calcium gluconate stabilized with calcium saccharate was prepared in a ratio of 9:1. To prepare this solution, 18 grams of calcium, gluconate and 2 grams of calcium dissacharate were dissolved in 80 grams of water. The mixture was placed in a 250 ml Pyrex bottle and loosely capped. The bottle was then autoclaved at 121° C. for up to about 30 minutes. The bottle was then vigorously shaken and re-autoclaved until all of the calcium gluconate/saccharate was dissolved. The solution was allowed to cool overnight.

A series of samples were prepared according to the following protocol.

TABLE 1

| Experiment | Time(hrs) | MSNF(%)* | Calcium (% total solids) |
|---|---|---|---|
| High Ca | 24 | 35 | 2.748 |
|  | 20 | 30 | 2.748 |
|  | 0 | 25 | 2.748 |
| Med Ca | 24 | 35 | 2.061 |
|  | 12 | 30 | 2.061 |
|  | 0 | 25 | 2.061 |
| Low Ca | 24 | 35 | 1.374 |
|  | 12 | 30 | 1.374 |
|  | 0 | 25 | 1.374 |

*MSNF milk-solids-non-fat in mix (%)

The high level of calcium (2.748%) represents a 100% increase in calcium content as compared to normal nonfat dry milk. The central level (2.061%) represents a 50% increase, and the low level (1.374%) represents no calcium fortification at all, i.e., the level of calcium in normal milk. Samples were prepared at each of the foregoing calcium fortification levels, at 35%, 30% and 25% MSNF levels. The holding time prior to spray drying each sample was also varied at three levels, i.e., 24 hrs., 12 hrs. and 0 hrs.

Preparation of Non-Fat Dry Milk Samples

For experimental purposes, 10 pound batches of preconcentrate were made. The appropriate amounts of water, nonfat dry milk and calcium gluconate/saccharate solution were weighed to the nearest one-tenth of a gram, and combined in a Waring high speed blender. The samples were mixed on the medium setting for three minutes, then transferred to a five gallon milk can. Some samples were either spray dried immediately or refrigerated for the appropriate amount of time as determined by the experimental plan.

Spray drying was accomplished using an Anyhdro pilot plant scale spray dryer (Size No. 1) using the following processing parameters:

inlet temperature=160° C.
outlet=75° C.
atomizer head speed=14,000 rpm

The resulting powders were collected and sealed in one gallon plastic buckets. Average yield from 10 pounds of concentrate was 1.5 to 2.5 pounds.

ANALYSIS OF POWDERS

Dispersibility analysis (a) The method chosen to determine the rate of dispersion involved measuring the rate of change of electrical conductivity of reconstituted sample powder during the time of dispersal. The following procedure was used:

Ten grams of powder were placed on two layered 6"×6" squares of cheesecloth. The corners and edges were then fluted and fastened by a rubber band, forming a pouch around the milk powder. Distilled water (400 ml) was measured into a plastic beaker that had been adapted for the use of conductivity measurements.

The measuring cell used was a YSI model 3417, (K=1/cm) which was inserted by means of a rubber gasket into a hole at the bottom of the beaker. The beaker containing a 1" stir bar was then placed on a magnetic stirrer. The pouch of milk powder was suspended over the top of the beaker using a ring stand.

The conductivity meter was attached to a Perkin Elmer (model 23) recorder. The measurements commenced by immersing the sample ball in the water and simultaneously starting the recorder and magnetic stirrer. The stirrer was turned to a setting of 8.5, corresponding to the maximum speed without causing cavitation or foaming. The input settings for the conductivity meter and the recorder were selected at the 200 millimhos and 10 mv levels, respectively, at a chart speed of 40 cm/hr.

The changes in conductivity were recorded (in duplicate) for each powder until a maximum conductivity reading was reached and maintained for approximately 20 minutes.

Dispersibility index (DI) as employed herein is defined as the time required for a given powder to reach 50% of its maximum solubility. Using conductivity measurements, DI was measured by the time in seconds for the conductivity to reach 50% of its maximum value. To further aid in the assessment of the dispersion characteristics for the powders, the rate of dispersion (ROD) was calculated by the ratio of 50/DI which is the slope of the line from the origin to the 50% intercept of the sample powder's resulting conductivity curve. The units for ROD are %/second, while DI has units of seconds.

After completion of the measurements, the time at which the sample reached 50% of its maximum conductivity value was graphically determined. This value was then divided into 50 and the resulting number was used for statistical analysis. The time for the electrical conductivity to reach 50% of the maximum was determined graphically and reported as time for dispersal (DI). For greater accuracy, the recorder divisions were used to express the time for dispersion of the powders; the units for ROD are 50/square. The factor for conversion of squares to seconds is: 1 square = 18 seconds.

Calcium Determinations

Calcium determinations were performed as described for milk in the manufactures manual (Perkin-Elmer, 1973 *Analytical Methods For Atomic Absorption Spectrophotometry*, The Perkin-Elmer Corporation, Norwalk, Conn.).

pH Analysis

All milk powders, plus one trial for regular nonfat dry milk, were reconstituted to a level of 10% total solids (w/v) and held overnight at 36° F. The pH was then measured using a Fisher Accumet model 630 pH meter.

Bulk Density Analysis

Bulk density was determined as follows.

1. Loose bulk density—A 50 ml graduated cylinder was tared on a top loading balance, and thereafter filled to the top mark using a wide stem plastic funnel. The weight was determined and the bulk density was calculated. (Bulk density = weight/volume).

2. Packed bulk density—Same procedure as #1 above, except that the cylinder was gently tapped 150 times to determine the new volume.

Table II, below, contains the data obtained in Example I.

TABLE II

| Exp. # | MNSF (%) | TIME (HRS) | CATS (CALC) | CATS MEAS. % | LACTOSE IN SOL. (%) | TS (%) | BDLP g/ml | BDDP g/ml | ROD (%/t) | pH |
|---|---|---|---|---|---|---|---|---|---|---|
| 1 | 35 | 24 | 2.748 | 3.256 | 24.15 | 42.52 | 0.607 | 0.690 | 3.16 | 6.29 |
| 2 | 35 | 24 | 2.748 | 3.237 | 24.15 | 42.52 | 0.584 | 0.653 | 3.06 | 6.29 |
| 3 | 35 | 0 | 2.748 | 2.627 | 24.15 | 42.52 | 0.492 | 0.546 | 3.20 | 6.31 |
| 4 | 30 | 12 | 2.748 | 2.722 | 19.80 | 36.44 | 0.525 | 0.594 | 3.03 | 6.30 |
| 5 | 25 | 24 | 2.748 | 2.373 | 15.81 | 30.37 | 0.493 | 0.576 | 1.74 | 6.29 |
| 6 | 25 | 0 | 2.748 | 3.129 | 15.81 | 30.37 | 0.442 | 0.505 | 2.74 | 6.29 |
| 7 | 25 | 0 | 2.748 | 3.135 | 15.81 | 30.37 | 0.426 | 0.473 | 2.76 | 6.29 |
| 8 | 35 | 12 | 2.061 | 2.671 | 22.94 | 38.51 | 0.570 | 0.637 | 2.74 | 6.59 |
| 9 | 30 | 24 | 2.061 | 2.652 | 18.97 | 33.01 | 0.487 | 0.557 | 1.98 | 6.38 |
| 10 | 30 | 12 | 2.061 | 2.112 | 18.97 | 33.01 | 0.500 | 0.556 | 2.27 | 6.43 |
| 11 | 30 | 12 | 2.061 | 2.468 | 18.97 | 33.01 | 0.543 | 0.631 | 2.24 | 6.41 |
| 12 | 30 | 0 | 2.061 | 2.614 | 18.97 | 33.01 | 0.462 | 0.522 | 2.80 | 6.40 |
| 13 | 25 | 12 | 2.061 | 2.112 | 15.28 | 27.51 | 0.436 | 0.495 | 1.75 | 6.58 |
| 14 | 35 | 24 | 1.374 | 1.057 | 22.02 | 35.19 | 0.504 | 0.586 | 1.57 | 6.71 |
| 15 | 35 | 0 | 1.374 | 1.718 | 22.02 | 35.19 | 0.449 | 0.554 | 2.12 | 6.70 |
| 16 | 35 | 0 | 1.374 | 1.724 | 22.02 | 35.19 | 0.446 | 0.547 | 2.31 | 6.70 |
| 17 | 30 | 12 | 1.374 | 1.896 | 18.34 | 30.17 | 0.469 | 0.552 | 1.07 | 6.72 |
| 18 | 25 | 24 | 1.374 | 1.439 | 14.86 | 25.14 | 0.432 | 0.494 | 0.53 | 6.71 |
| 19 | 25 | 24 | 1.374 | 1.451 | 14.86 | 25.14 | 0.298 | 0.333 | 0.73 | 6.71 |
| 20 | 25 | 0 | 1.374 | 1.292 | 14.86 | 25.14 | 0.429 | 0.505 | 1.69 | 6.72 |

CATS = calcium content in % total solids.
BDLP = bulk density of powder by loose packing.
BDDP = bulk density of powder by dense packing.
ROD = rate of dispersion of powder (%/t = % powder dispersed over time)

Figure 1B:
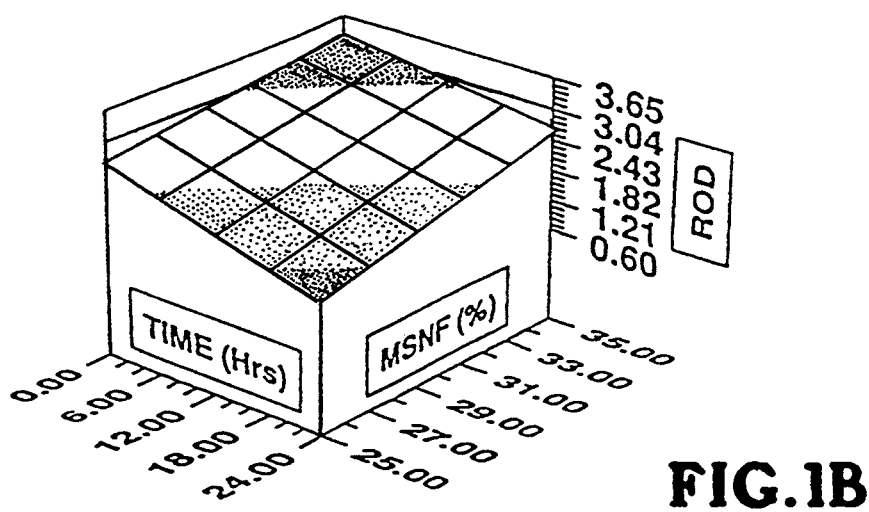
Figure 1C:
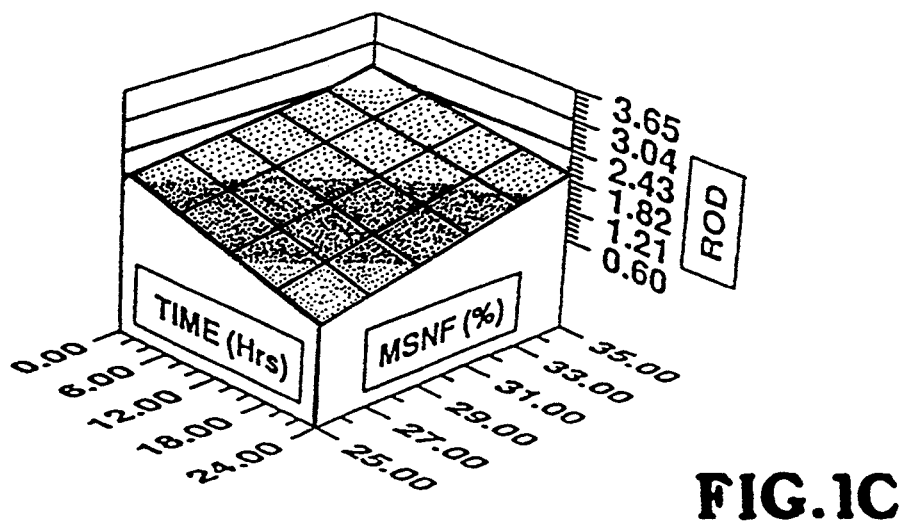

The data of Table II clearly show that the rate of dispersion (ROD) was greatest at the highest calcium fortification levels, and at the highest MSNF % levels. FIG. 1 is a series of three dimensional graphs demonstrating the relationship of rate of dispersion (ROD), holding time and % MSNF, at the high FIG. 1A, medium (FIG. 1B) and low (FIG. 1C) calcium fortification levels. FIG. 1 clearly shows that the ROD was highest at the high calcium fortification levels, and the highest NSNF % levels.

State of Lactose in Powders

Using polarized light microscopy, the presence of lactose crystals was easily determined. In order to discern any lactose crystals embedded in the powder particles the sample preparation involved hydrating the powder in a 35% solution of lactose (saturated). The lactose solution was prepared by placing 35 grams of lactose in 100 grams of water and heating until the lactose dissolved. Approximately 0.1 ml of this cool (25° C.) solution was placed on a slide. Next, a small amount of the sample powder was sprinkled on the slide and covered with a cover slip for immediate examination. The powders were mounted on the microscope stage and then photographed at magnifications of 32 and 80 times, using objectives of 10 and 25 X and polarized light filters. Shutter speeds ranged from 1 to ⅛th of a second. The pictures were taken with Fuji color film, ASA 200.

Microphotographs of each powder were obtained in order to determine the presence or absence of crystallized lactose.

Figure 2A:
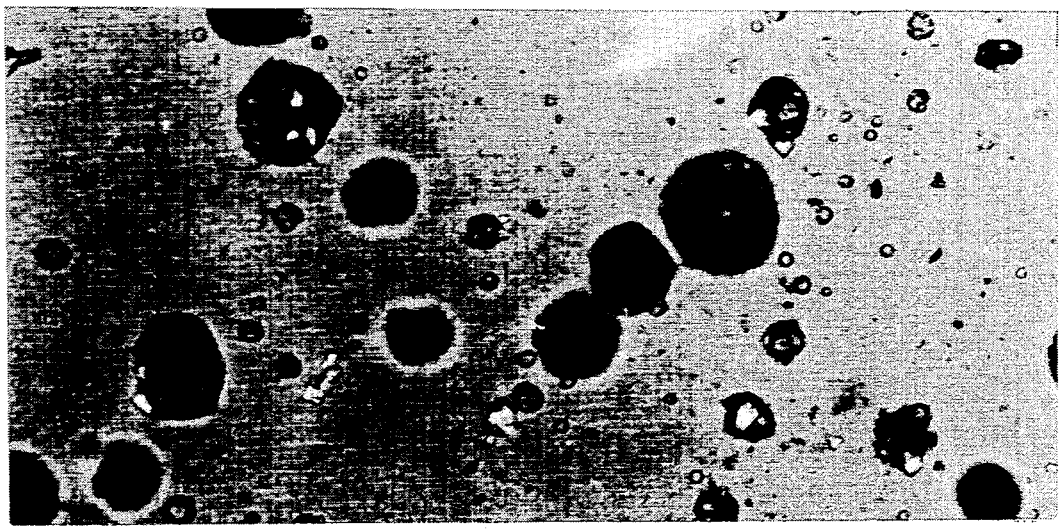
FIG. 2 depicts polarization microscopy of milk powder with 100% calcium fortification at 35% MSNF—24 hrs (FIG. 2A), 30% MSNF—12 hrs (FIG. 2B) and 25% MSNF—24 hrs (FIG. 2C).
Figure 2B:
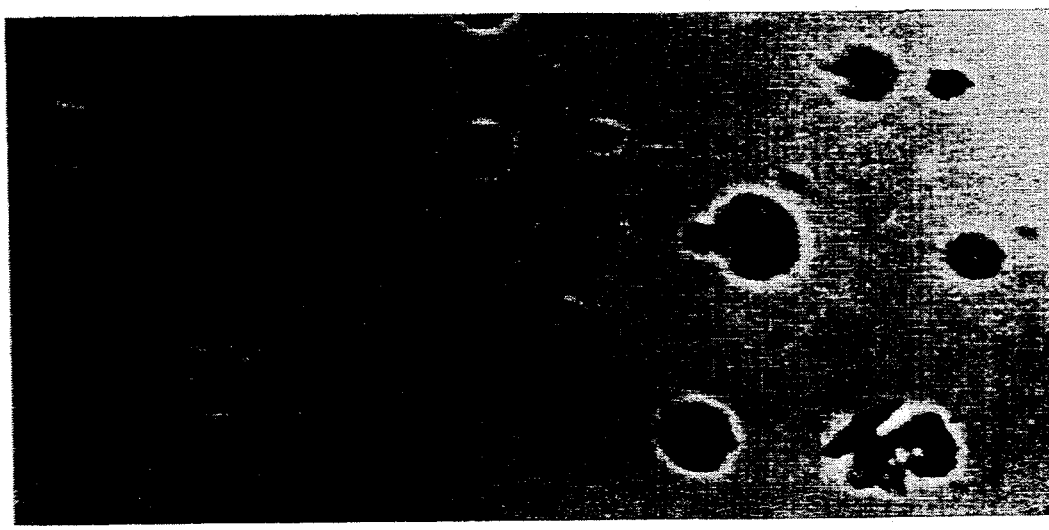
Figure 2C:
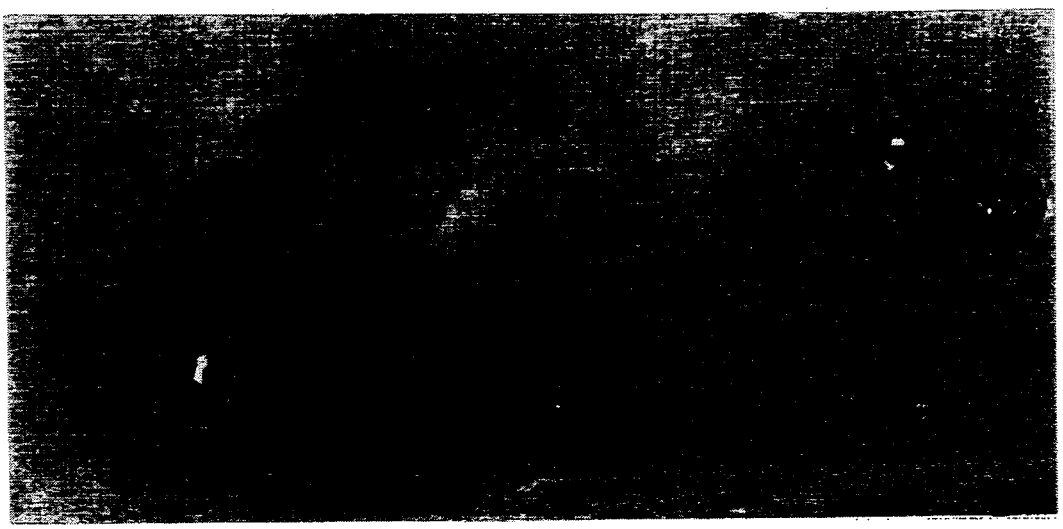

FIG. 2 depicts polarization microscopy of milk powder with 100% calcium fortification at 35% MSNF—24 hrs (FIG. 2A), 30% MSNF—12 hrs (FIG. 2B) and 25% MSNF—24 hrs (FIG. 2C).

Figure 3A:
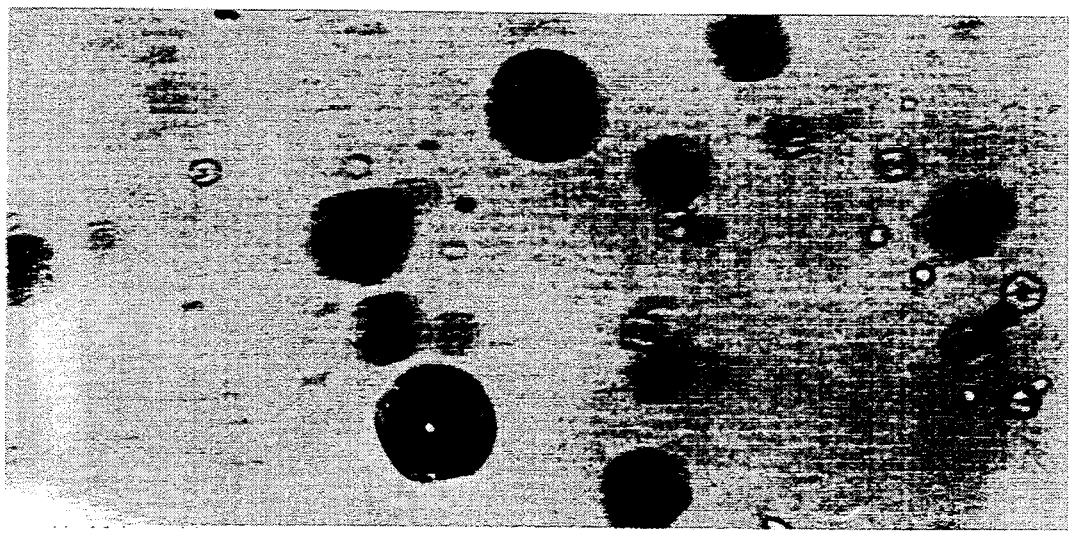
FIG. 3 shows polarized microscopy of milk powder with 50% calcium fortification at 35% MSNF—24 hrs (FIG. 3A), 30% MSNF 12-hrs (FIG. 3B) and 25% MSNF—24 hrs (FIG. 3C).
Figure 3B:
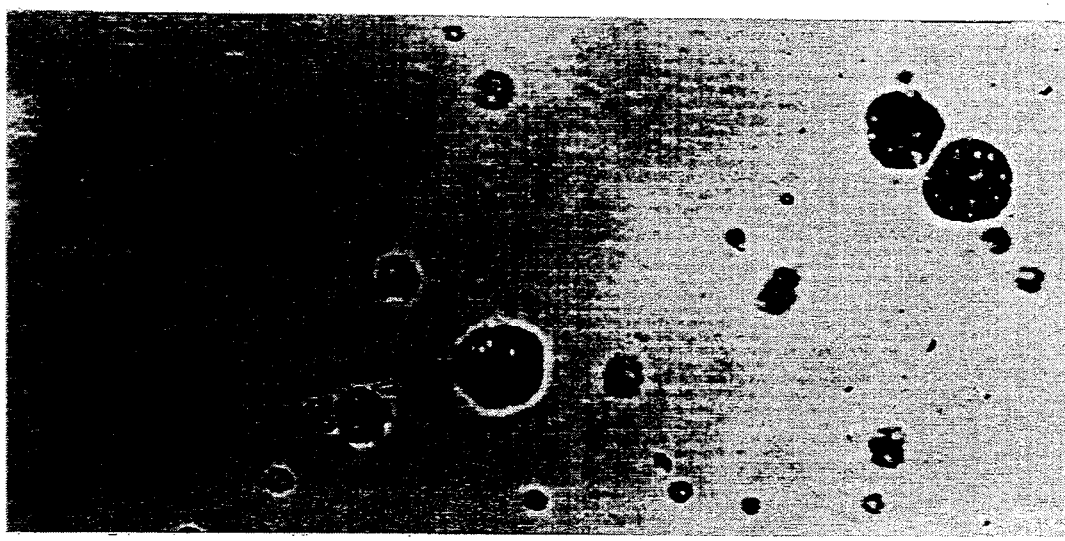
Figure 3C:

FIG. 3 shows polarized microscopy of milk powder with 50% calcium fortification at 35% MSNF—24 hrs (FIG. 3A), 30% MSNF 12-hrs (FIG. 3B) and 25% MSNF—24 hrs (FIG. 3C).

Figure 4A:
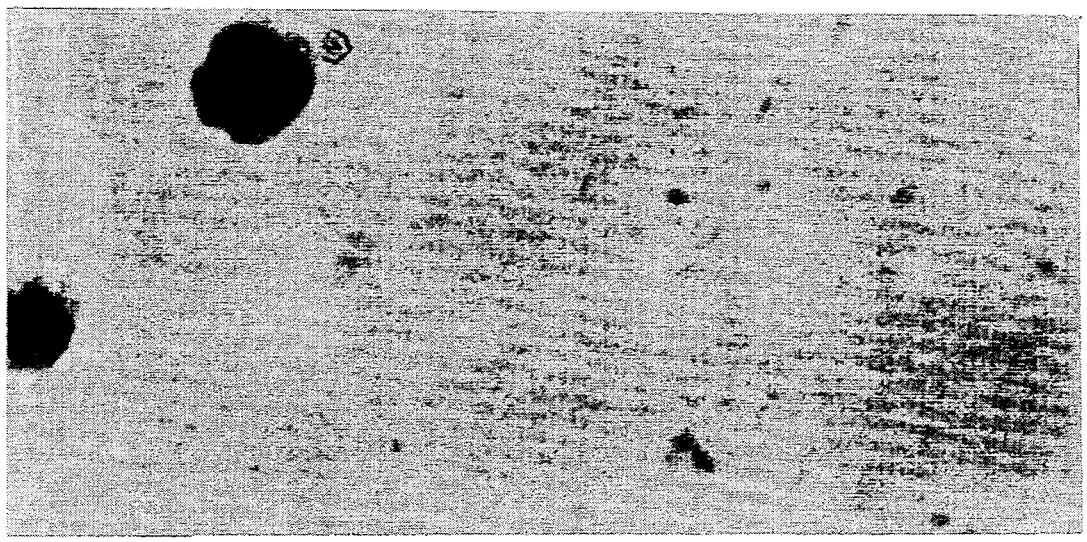
FIG. 4 shows the polarized microscopy of milk powder with 0% calcium fortification at 35% MSNF—24 hrs (FIG. 4A), at 30% MSNF—12 hrs (FIG. 4B), and 25% MSNF—24 hrs (FIG. 4C).
Figure 4B:
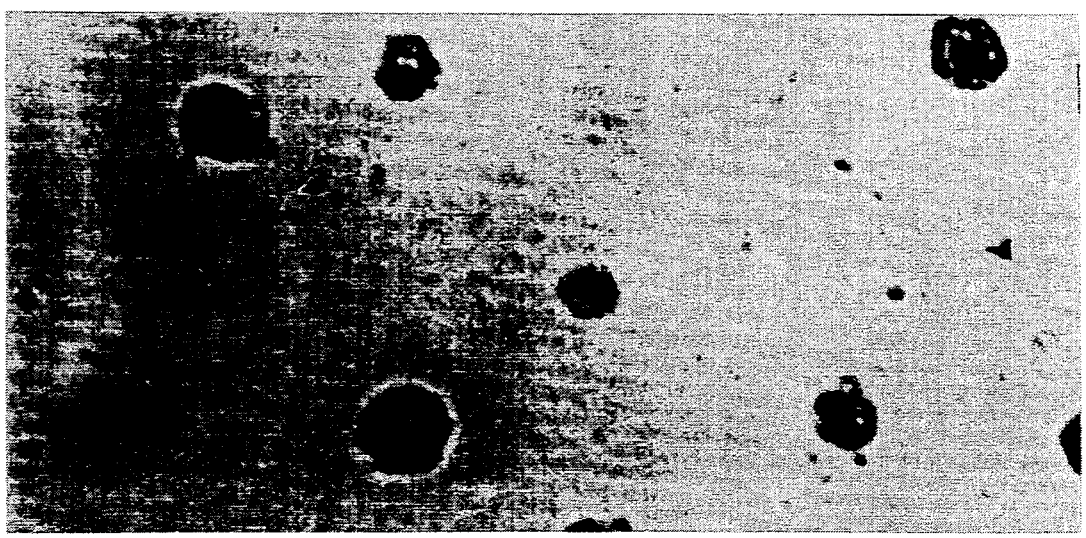
Figure 4C:
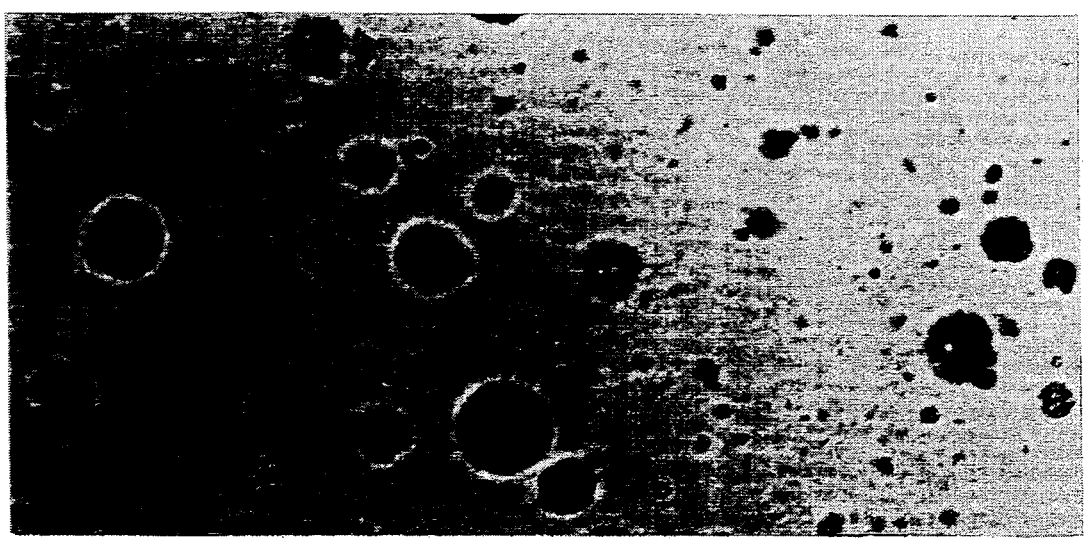

FIG. 4 shows the polarized microscopy of milk powder with 0% calcium fortification at 35% MSNF—24 hrs, (FIG. 4A) at 30% MSNF—12 hrs, (FIG. 4B) and 25% MSNF—24 hrs (FIG. 4C).

FIGS. 2-4 clearly shows that powders with increased total solids content and higher levels of calcium fortification contained highest amounts of lactose crystals. Lactose crystals do not normally occur in prior art spray dried nonfat dry milk and their presence in these samples reflect the result of the processing conditions in accordance with the present invention. Thus, the dispersibility data in Table 2 and FIG. 1, clearly show the highest ROD for powders with high MSNF % levels, and high calcium fortification levels, while the microscopies of FIGS. 2-4 clearly show that the best dispersibility as measured by ROD also showed a preponderance of lactose crystals.

EXAMPLE 2

NFDM Fortified with Calcium Lactogluconate (CAL)

The milk product employed in this example is a milk concentrate obtained from Ross Laboratories, Columbus, Ohio.

Preparation of Calcium Lactogluconate

Mixtures of calcium lactate (1 part) and calcium gluconate (2 parts) are dissolved in water and concentrated by evaporation. Isolation and drying techniques vary including crystallization with ethanol or spray drying.

Preparation of the Calcium Fortified Milk Powder

To prepare a twenty pound batch of a concentrate containing 35% MSNF and a 100% increase in calcium content (2.75% Ca in total solids), 8401 grams of condensed skim milk (38% MSNF) were mixed with 576.2 grams of CAL and 94 grams of water. The mixture was heated to 72° C. under constant stirring and then rapidly cooled to 1°-2° C. to initiate lactose crystallization. The concentrate was seeded by the addition of 25 grams of lactose and held for 1-2 hours under constant agitation. Finally, the cold concentrate was fed to a spray dryer without preheating and the powder collected for further analysis. The final product was fortified at the 100% level, and contained 35% MSNF.

State of Lactose

Figure 5:
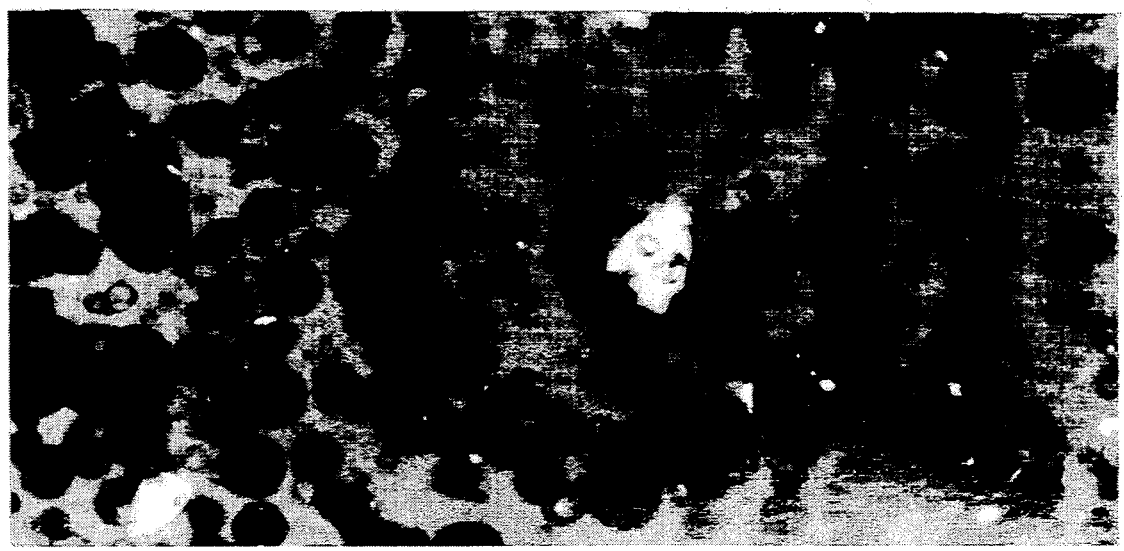
FIG. 5 shows the polarized microscopy of milk powder fortified with calcium lactogluconate (100% fortification level) at 35% MSNF.

FIG. 5 is a microphotograph by polarizing light microscopy of the final product which shows a relatively large number of small lactose crystals scattered throughout the field's evidenced by the birefringent (shiny) particles and specks.

Dispersibility

Table III, below show a comparison of the ROD of the calcium lactogluconate (CAL) fortified nonfat dry milk of Example 2, as compared to conventional hi-heat nonfat dry milk.

TABLE III

| Sample | DI (sec.) | ROD %/t |
|---|---|---|
| Hi-Heat NFDM | 1050 | 0.86 |
| CAL-NFDM | 618 | 1.46 |

As the data in Table III show, the ROD of the milk powder of the present invention is significantly greater than conventional NFDM.

The foregoing examples clearly illustrate the improved dispersibility of the calcium fortified powders of the present invention. Furthermore, the experiments clearly show that the present process produces calcium fortified milk powders which contain a significant amount of crystalline lactose. This formation of crystalline lactose greatly mitigates the problems of lumping associated with prior art milk powders which contain primarily amorphous lactose, and contributes to the improved dispersibility of the present powders.

We claim:

1. A process of preparing a calcium fortified dry milk powder with improved dispersibility in aqueous media which comprises blending a milk product with a calcium fortification system to form a calcium fortified mixture; cooling said calcium-fortified mixture down to a temperature effective to initiate lactose crystallization; and, dehydrating said calcium-fortified mixture to obtain a calcium fortified dry milk powder with improved dispersibility in aqueous media.

2. The process of claim 1 wherein the milk product is selected from the group consisting of skimmed milk, lowfat milk, whole milk, filled milk, condensed milk, evaporated milk, concentrated milk, reconstituted milk and mixtures thereof.

3. The process of claim 1 wherein the calcium fortification system comprises calcium gluconate and calcium saccharate.

4. The process of claim 1 wherein the calcium fortification system comprises calcium lactogluconate.

5. The process of claim 1 wherein, said milk product is concentrated milk and said calcium fortification system comprises calcium gluconate and calcium saccharate.

6. The process of claim 1 wherein the calcium fortified mixture is concentrated to a level of between about 30 wt % to about 55% MSNF prior to initiation of lactose crystallization.

7. The process of claim 1 wherein dehydration of the calcium fortified mixture is achieved by spray drying.

8. The process of claim 7 wherein the calcium fortified mixture is spray dried immediately after initiation of lactose crystallization.

9. A process of preparing a calcium fortified dry milk powder with improved dispersibility in aqueous media which comprises blending concentrated milk with a calcium fortification system comprising calcium gluconate and calcium saccharate to form a calcium fortified mixture; pasteurizing said calcium fortified mixture; cooling said calcium fortified mixture down to a temperature of from 0° C. to about 20° C. and holding the calcium fortified mixture at said temperature for a time period sufficient for initiation of lactose crystallization; and, spray drying said calcium fortified mixture to obtain a calcium fortified dry milk powder with improved dispersibility.

10. A process of preparing a calcium fortified dry milk powder with improved dispersibility in aqueous media which comprises blending a pasteurized concentrated milk product with a calcium fortification system to obtain a calcium fortified mixture; rapidly cooling said calcium fortified mixture to a temperature range of from about 1° C. to about 3° C. and holding same at said temperature range until initiation of lactose crystallization; and spray drying said calcium fortified mixture to obtain a calcium fortified dry milk powder with improved dispersibility.

11. The process of claim 10 wherein the pH of said calcium fortified mixture is adjusted to a pH range of from about 6.7–7.1 prior to initiation of lactose crystallization.

* * * * *

UNITED STATES PATENT AND TRADEMARK OFFICE
CERTIFICATE OF CORRECTION

PATENT NO. : 5,397,589

DATED : March 14, 1995

INVENTOR(S) : D. Korte et al.

It is certified that error appears in the above—identified patent and that said Letters Patent is hereby corrected as shown below:

Title page, item [75], change inventor's name:
"Paul" should read --Poul--.

Col. 10, In claim 1, line 1, the word "bovine" should be inserted before "milk".

Col. 10, In claim 1, line 5, "pasteurizing said calcium fortified mixture;" should be inserted before "cooling".

Col. 10, In claim 2, line 1, the word "bovine" should be inserted before "milk".

Col. 10, In claim 9, line 1, the word "bovine" should be inserted before "milk".

Col. 11, In claim 10, line 2, the word "bovine" should be inserted before "milk".

Signed and Sealed this

Fourth Day of July, 1995

Attest:

BRUCE LEHMAN

Attesting Officer

Commissioner of Patents and Trademarks